(12) United States Patent
Metivier et al.

(10) Patent No.: US 9,976,876 B2
(45) Date of Patent: May 22, 2018

(54) METHODS AND APPARATUS FOR PHASE SELECTION IN RING MAGNET SENSING

(71) Applicant: ALLEGRO MICROSYSTEMS, LLC, Worcester, MA (US)

(72) Inventors: Ryan J. Metivier, Nashua, NH (US); Yannick Vuillermet, Voglans (FR)

(73) Assignee: ALLEGRO MICROSYSTEMS, LLC, Manchester, NH (US)

( * ) Notice: Subject to any disclaimer, the term of this patent is extended or adjusted under 35 U.S.C. 154(b) by 87 days.

(21) Appl. No.: 14/950,104

(22) Filed: Nov. 24, 2015

(65) Prior Publication Data

US 2017/0146366 A1    May 25, 2017

(51) Int. Cl.
*G01B 7/30* (2006.01)
*G01R 33/07* (2006.01)
*G01D 5/14* (2006.01)

(52) U.S. Cl.
CPC .................. *G01D 5/145* (2013.01)

(58) Field of Classification Search
CPC ....................................... G01B 7/30
USPC ................................... 324/207.25
See application file for complete search history.

(56) References Cited

U.S. PATENT DOCUMENTS

| 4,385,273 | A | | 5/1983 | Lienhard et al. |
| 4,922,606 | A | | 5/1990 | Alexander et al. |
| 5,241,267 | A | * | 8/1993 | Gleixner et al. ............ 324/207.2 |
| 5,686,879 | A | | 11/1997 | Schuhl et al. |
| 6,426,620 | B1 | | 7/2002 | Taguchi et al. |
| 8,896,295 | B2 | | 11/2014 | Friedrich et al. |
| 8,922,206 | B2 | | 12/2014 | Friedrich et al. |
| 8,952,471 | B2 | | 2/2015 | Doogue et al. |
| 9,007,054 | B2 | | 4/2015 | Friedrich et al. |
| 9,588,134 | B2 | * | 3/2017 | Ausserlechner et al. ..... 702/151 |
| 2003/0151406 | A1 | | 8/2003 | Wan et al. |
| 2005/0045359 | A1 | | 3/2005 | Doogue et al. |
| 2006/0097715 | A1 | * | 5/2006 | Oohira et al. ............. 324/207.2 |
| 2006/0202677 | A1 | * | 9/2006 | Schmidt .................... 324/207.2 |
| 2013/0057257 | A1 | | 3/2013 | Friedrich et al. |
| 2013/0069635 | A1 | * | 3/2013 | Kitamoto ................... 324/207.2 |
| 2013/0099708 | A1 | * | 4/2013 | Shimizu et al. ......... 318/400.39 |

(Continued)

FOREIGN PATENT DOCUMENTS

| EP | 1 225 453 | | 7/2002 |
| EP | 2546611 | A1 | 1/2013 |

(Continued)

OTHER PUBLICATIONS

PCT/US2007/000093 International Search Report dated Feb. 5, 2008, 2 pages.

(Continued)

*Primary Examiner* — Bot Ledynh
(74) *Attorney, Agent, or Firm* — Daly, Crowley Mofford & Durkee, LLP

(57) ABSTRACT

Methods and apparatus for positioning a magnetic field sensor IC package having a first channel for a planar magnetic field sensing element and a second channel for vertical magnetic field sensing element in relation to an axis of a ring magnet to provide a desired phase relationship between the first and second channels. In embodiments, positioning the sensor includes an offset angle and a displacement with respect to a centerline of the ring magnet.

12 Claims, 13 Drawing Sheets

(56) References Cited

U.S. PATENT DOCUMENTS

2013/0265037 A1* 10/2013 Friedrich et al. .......... 324/207.2
2014/0156220 A1   6/2014 Okamoto et al.
2014/0176125 A1   6/2014 Friedrich et al.
2014/0347044 A1  11/2014 Monreal et al.
2015/0008907 A1   1/2015 Janisch
2015/0354985 A1  12/2015 Judkins et al.

FOREIGN PATENT DOCUMENTS

WO    WO 03/019216    3/2003
WO    WO 2007/087121  8/2007

OTHER PUBLICATIONS

PCT/US2007/000093 International Preliminary Report on Patentability dated Jul. 22, 2008, 8 pages.
PCT Search Report and Written Opinion dated Jan. 4, 2017 corresponding to International Application No. PCT/US2016/058563; 11 Pages.

* cited by examiner

When α >0, y axis rotates in direction of z axis
Displayed position is α ≈ -20°

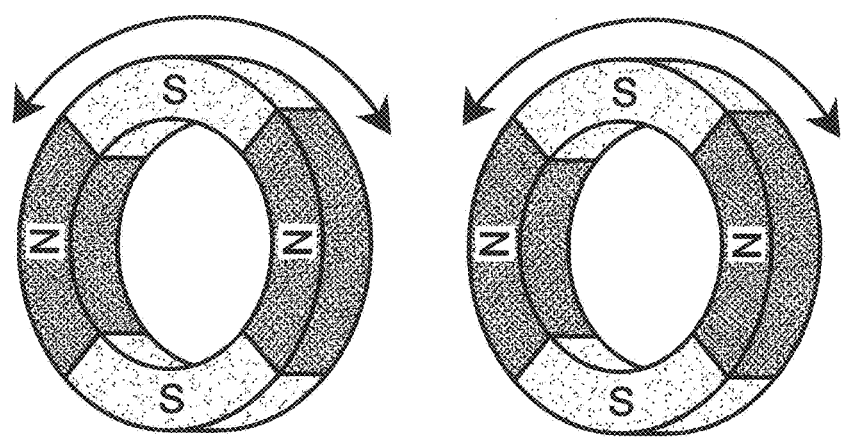
   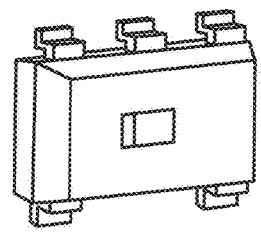
*FIG. 5A*          *FIG. 5B*

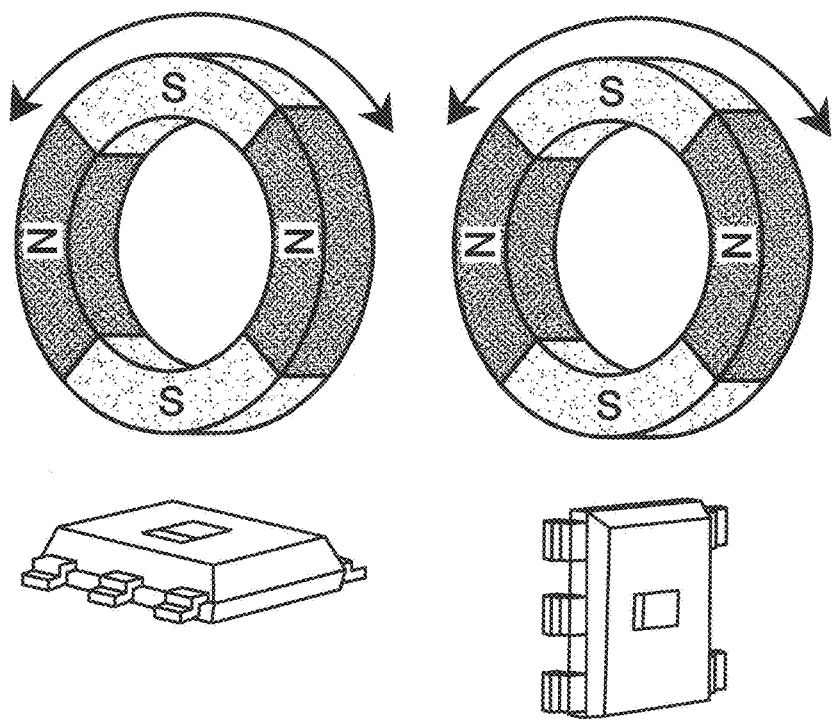
*FIG. 5C*    *FIG. 5D*

METHODS AND APPARATUS FOR PHASE SELECTION IN RING MAGNET SENSING

BACKGROUND

As is known, there are a variety of types of magnetic field sensing elements, including, but not limited to, Hall effect elements, magnetoresistance elements, and magnetotransistors. As is also known, there are different types of Hall effect elements, for example, a planar Hall element, a vertical Hall element, and a circular Hall element. As is also known, there are different types of magnetoresistance elements, for example, a giant magnetoresistance (GMR) element, an anisotropic magnetoresistance element (AMR), a tunneling magnetoresistance (TMR) element, and a magnetic tunnel junction (MTJ).

Hall effect elements generate an output voltage proportional to a magnetic field. In contrast, magnetoresistance elements change resistance in proportion to a magnetic field. In a circuit, an electrical current can be directed through the magnetoresistance element, thereby generating a voltage output signal proportional to the magnetic field.

Magnetic field sensors, i.e., circuits that use magnetic field sensing elements, are used in a variety of applications, including, but not limited to, a current sensor that senses a magnetic field generated by a current carried by a current-carrying conductor, a magnetic switch that senses the proximity of a ferromagnetic object, a rotation detector that senses passing ferromagnetic articles, for example magnetic domains of a ring magnet, and a magnetic field sensor that senses a magnetic field density of a magnetic field.

SUMMARY

The present invention provides methods and apparatus for positioning a multi-channel magnetic field sensor in relation to a ring magnet to achieve a desired electrical phase relationship for the sensor outputs. In illustrative embodiments, the magnetic field sensor is positioned to have an offset angle, which can be referred to as 'twist,' with respect to a centerline of the ring magnet and a displacement of magnetic field sensing elements in the magnetic sensor from the center of the ring magnet.

In one aspect of the invention, a method comprises: for a magnetic field sensor IC package having a first channel for a planar magnetic field sensing element and a second channel for a vertical magnetic field sensing element, receiving a desired phase relationship between the first and second channels; and positioning the IC package in relation to an axis of a ring magnet to provide the desired phase relationship between the first and second channels.

The method can further include one or more of the following features: positioning the IC package to a non-zero twist angle with respect to the axis and a non-zero displacement with respect to the axis, the axis corresponds to a centerline of the ring magnet, the centerline corresponds to one half a width of the ring magnet, the desired phase relationship is about 120 degrees, the desired phase relationship is about 60 degrees, displacing the IC package position a distance from an axis of rotation of the ring magnet, the IC package has a longitudinal axis defined by being perpendicular to a sensing direction of the first sensing element, wherein the twist angle is defined by the longitudinal axis of the IC package and the centerline of the ring magnet, the phase relationship is selected using a mesh function of the offset angle and displacement for the sensor, a substantially planar face of the IC package defines an air gap with a surface of the ring magnet, the planar magnetic field sensing element and the vertical magnetic field sensing element are formed as part of a single die, the planar magnetic field sensing element and the vertical magnetic field sensing element are substantially collocated, positioning the IC package to lessen sensitivity to mechanical tolerances, and/or the first sensing element comprises a Hall element.

In another aspect of the invention, an apparatus comprises: a ring magnet; and a magnetic field sensor IC package positioned in relation to a ring magnet to achieve a selected phase relationship between a first channel for a planar magnetic field sensing element and a second channel for a vertical magnetic field sensing element.

The apparatus can further include one or more of the following features: the IC package is positioned to a non-zero twist angle with respect to the axis and a non-zero displacement with respect to the axis, the axis corresponds to a centerline of the ring magnet, the centerline corresponds to one half a width of the ring magnet, the desired phase relationship is about 120 degrees, the desired phase relationship is about 60 degrees, the IC package is positioned a distance from an axis of rotation of the ring magnet, the IC package has a longitudinal axis defined by being perpendicular to a sensing direction of the first sensing element, wherein the twist angle is defined by the longitudinal axis of the IC package and the centerline of the ring magnet, the phase relationship is selected using a mesh function of the offset angle and displacement for the sensor, a substantially planar face of the IC package defines an air gap with a surface of the ring magnet, the planar magnetic field sensing element and the vertical magnetic field sensing element are formed as part of a single die, the planar magnetic field sensing element and the vertical magnetic field sensing element are substantially collocated, and/or the IC package is positioned to lessen sensitivity to mechanical tolerances.

BRIEF DESCRIPTION OF THE DRAWINGS

The foregoing features of this invention, as well as the invention itself, may be more fully understood from the following description of the drawings in which:

FIGS. 5A and 5B show positioning of a magnetic field sensor having planar and vertical magnetic field sensing elements in relation to a ring magnet;

FIGS. 5C and 5D shows an alternative positioning of a magnetic field sensor having planar and vertical magnetic field sensing elements in relation to a ring magnet;

DETAILED DESCRIPTION

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit, which can be provided in an IC package, that uses a magnetic field sensing element(s), generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

Figure 1:
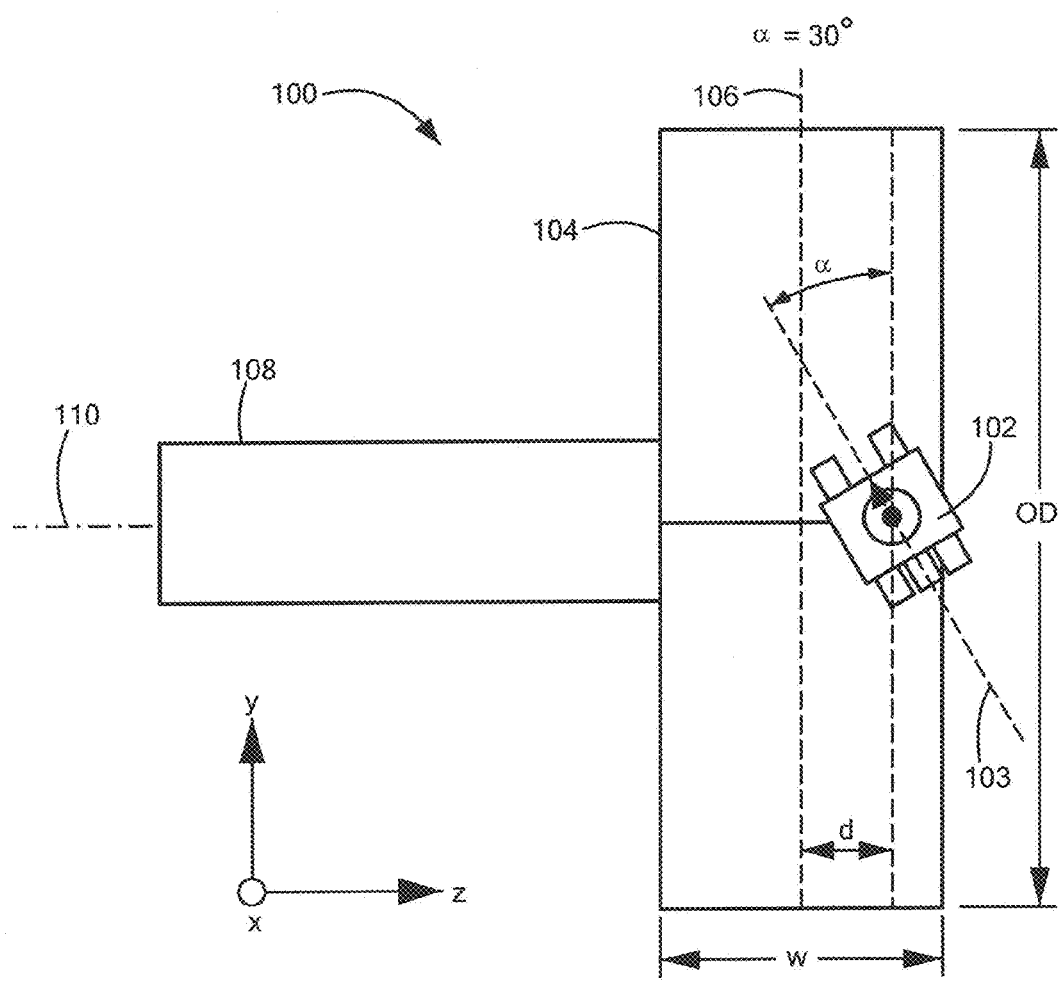
FIG. 1 is a schematic representation of a multi-channel magnetic field sensor positioned in relation to a ring magnet.

FIG. 1 shows a system 100 including a multi-channel magnetic field sensor 102 positioned in relation to a ring magnet 104. The magnetic field sensor 102 can sense magnetic fields orthogonal to one another. The sensor 102 is offset at an angle from a centerline of the ring magnet 106 and displaced from the centerline, as described more fully below. In embodiments, the centerline 106 corresponds to the middle of the width w of the ring magnet 104. The ring magnet 104 refers to magnetic material, such as permanent magnets.

Figure 1A:
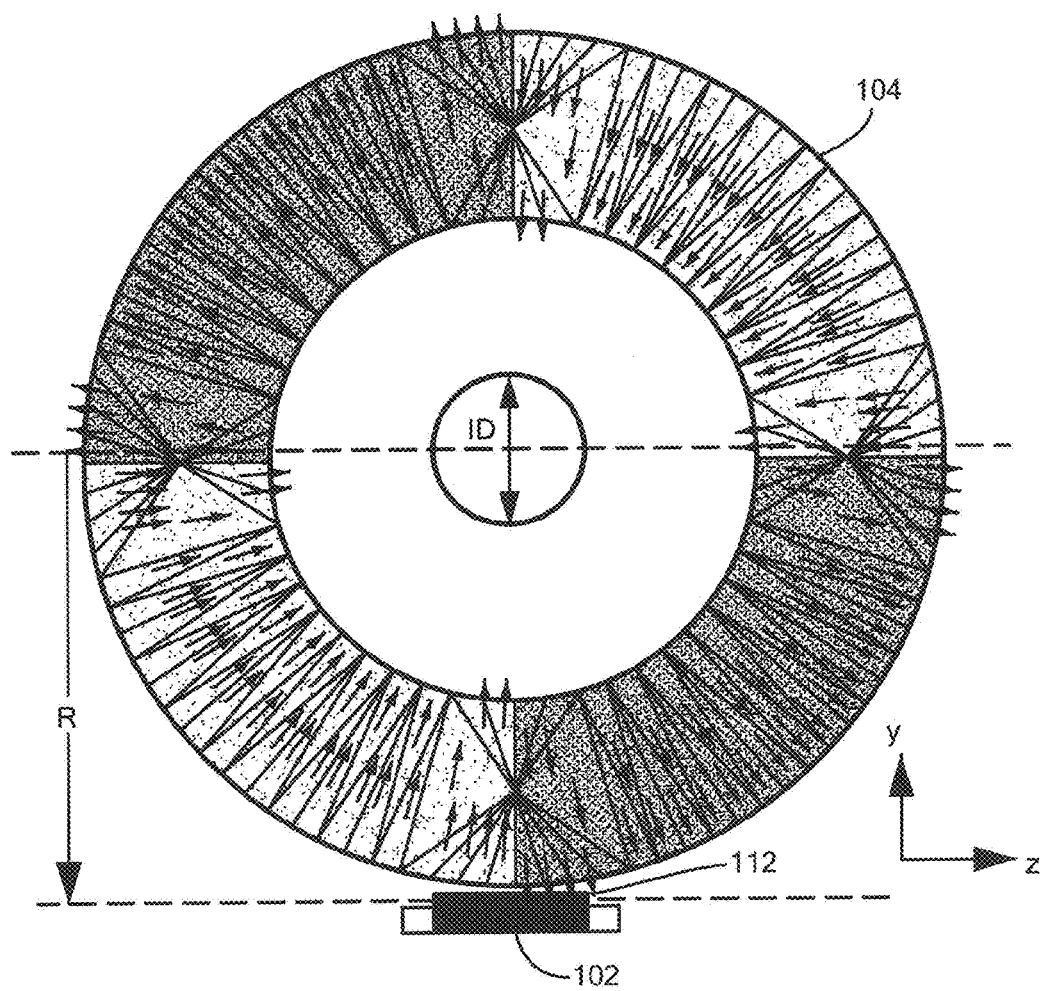
FIG. 1A is a schematic representation of the ring magnet and sensor of FIG. 1.

The ring magnet 104 has a number of pole pairs (npp) forming a radial magnetization. The ring magnet 104 has an outer diameter OD and an inner diameter ID (FIG. 1A), which corresponds to a shaft 108 of the ring magnet. It is understood that in embodiments, the ring magnet has an ID of 0 mm such that the magnet could be press fit or glued to the end of a rotating shaft, for example. A distance R is the distance between a rotation axis 110 of the shaft and sensing elements 112 of the magnetic field sensor 102. A displacement d refers to the distance between the centerline 106 of the ring magnet and the location of the magnetic field sensing elements 112 of the magnetic sensor 102. In embodiments, the magnetic field sensing elements are aligned with the rotation axis 110 of the ring magnet. In the illustrated embodiment, the twist/offset angle α is about 30 degrees and the displacement d is about 4 mm. In one embodiment, the centerline 106 of the ring magnet is defined by a width w of the ring magnet 104. For a displacement of d=0, the magnetic field sensing elements 112 of the sensor are aligned with the centerline 106 of the ring magnet.

In general, ring magnets have ninety degrees of phase shift between planar and vertical fields. The magnetic field sensor 102 is offset and displaced from the centerline of the magnet 104 for modifying the phase between the sensor outputs to a desired amount. By 'twisting' the position of the sensor 102, the angle in which the vertical Hall element faces the ring magnet 104 is altered. When the twist angle α is greater than 0 degrees, there is y axis rotation in a z axis direction, as can be seen. In embodiments, the offset or twist angle α is defined by a longitudinal axis 103 of the IC package through the magnetic field sensing elements with respect to the ring magnet centerline 106. It is understood that the longitudinal axis 103 is defined by one of the sensing elements 112 within the IC package, and more particularly, an axes of sensitivity of a sensing element.

Figure 2:
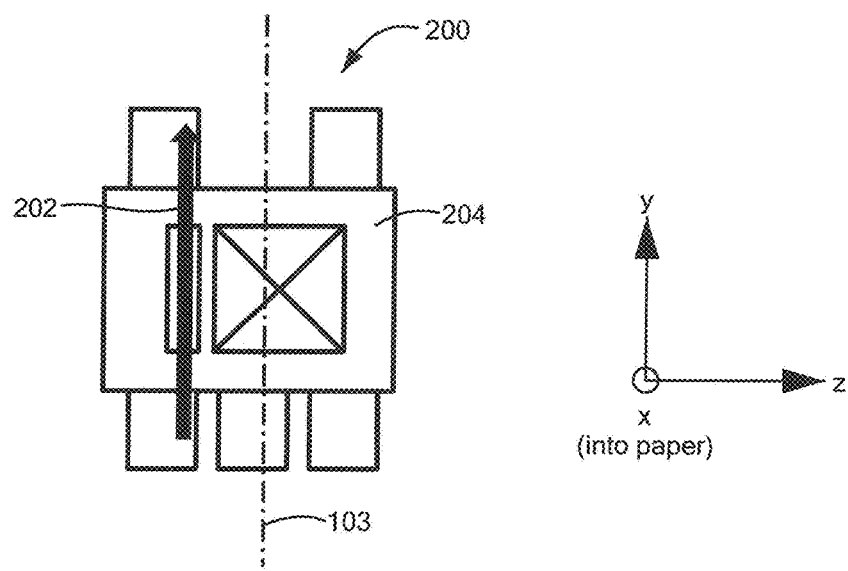
FIG. 2 is a schematic representation of magnetic field sensor having planar and vertical magnetic field sensing elements.

FIG. 2 shows longitudinal axis 103 defined by the axis of sensitivity of the first sensing element 202. Thus, the twist angle α in relation to the first sensing element is such that the sensor is rotated in the X Y/Z plane around the X axis for the illustrated embodiment. It is understood that the sensor rotates such that the distance R (FIG. 1A) from the center 110 of magnet rotation is constant for all points of the sensing element.

In embodiments, longitudinal axis 103 is defined by a sensitivity axis of one sensing element. In the embodiment of FIG. 2, axis 103 is defined by the first sensing element 202 sensing along Y, for example, where the axis 103 is parallel to the sensing direction of the first sensing element 202. In the illustrated embodiment, the field measured by the second sensing element 204 is independent of the sensor twist angle α, sensing direction being X. It is understood that the sensing elements are generally fixed in position within the IC package. Thus, a longitudinal axis of an IC package defines the axis in relation to the position of the sensing element(s) within the IC package.

For example, should an application require a nominal phase shift between channels of 120 degrees, the sensor is twisted and displaced such that the sensor outputs have an electrical phase relationship of 120 degrees instead of the nominal 90 degrees. It is understood that a wide range of phase relationships can be desired to meet the needs of a particular application.

Figure 1B:
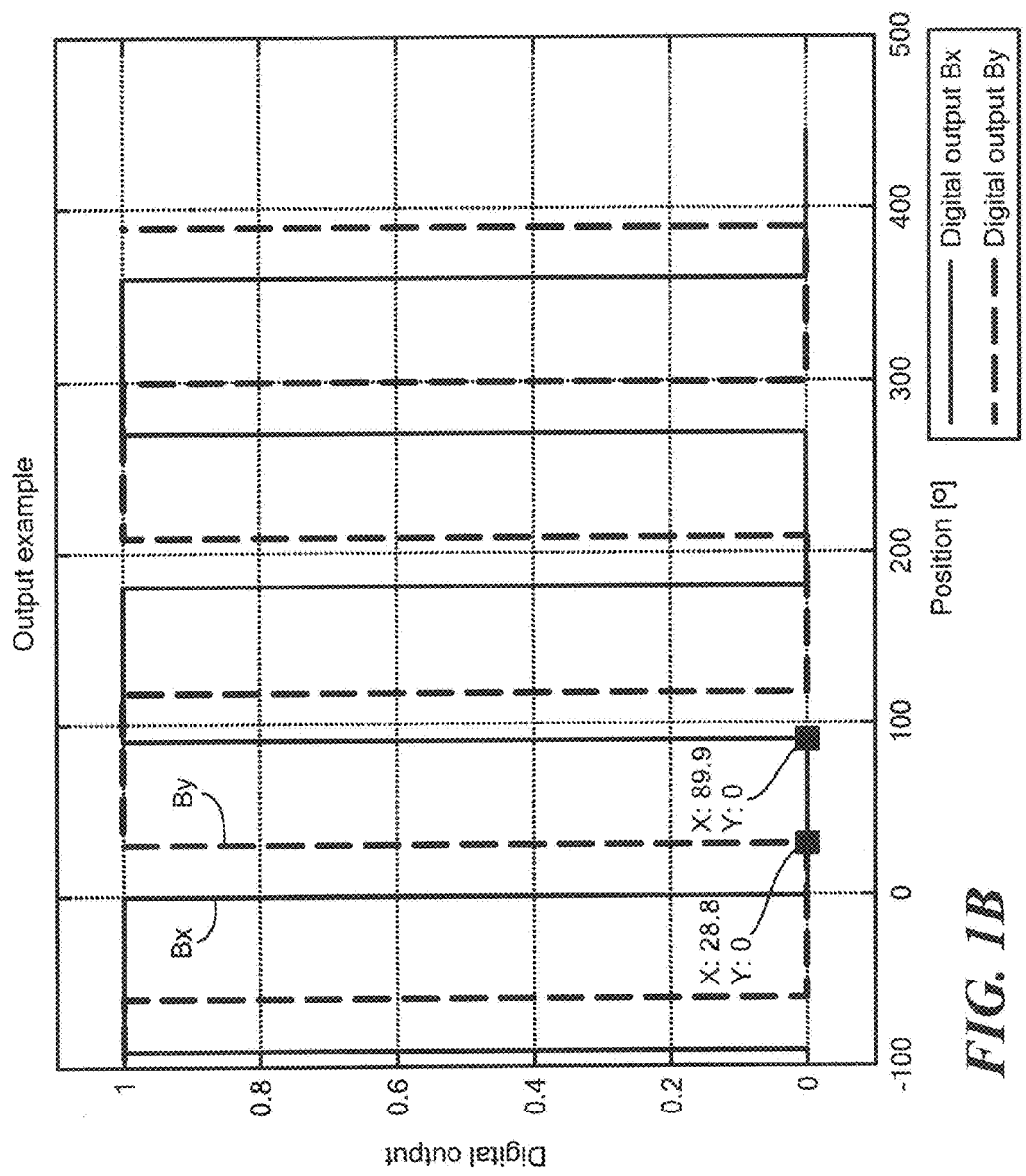
FIG. 1B is a graphical representation of outputs of the magnetic field sensor of FIG. 1.

FIG. 1B shows illustrative signals for first and second outputs Bx, By of the magnetic sensor with a phase offset of about 60 mechanical degrees, e.g., 89.9–28.8. As can be seen, digital output By rises at position X:28.8, Y:0 and digital output Bx rises at X:28.8, Y:0. This phase relationship between the outputs is achieved by an illustrative offset angle α of about –30 degrees and a displacement of about 4 mm.

FIG. 2 shows an illustrative magnetic field sensor 200 having a vertical Hall element 202 that is sensitive to magnetic fields in a plane parallel to a die face, shown as the y dimension, and a planar Hall element 204 that is sensitive to magnetic fields in a plane perpendicular to the die face, shown as the x dimension. The planar hall element 204 is sensitive in the X axis (into the paper in the illustrated embodiment), and the vertical hall element 202 is sensitive in the y axis. As described above, the axis 103 defined by one of the sensing elements defines the twist angle α in relation to the ring magnet centerline 106 (FIG. 1).

Figure 3:
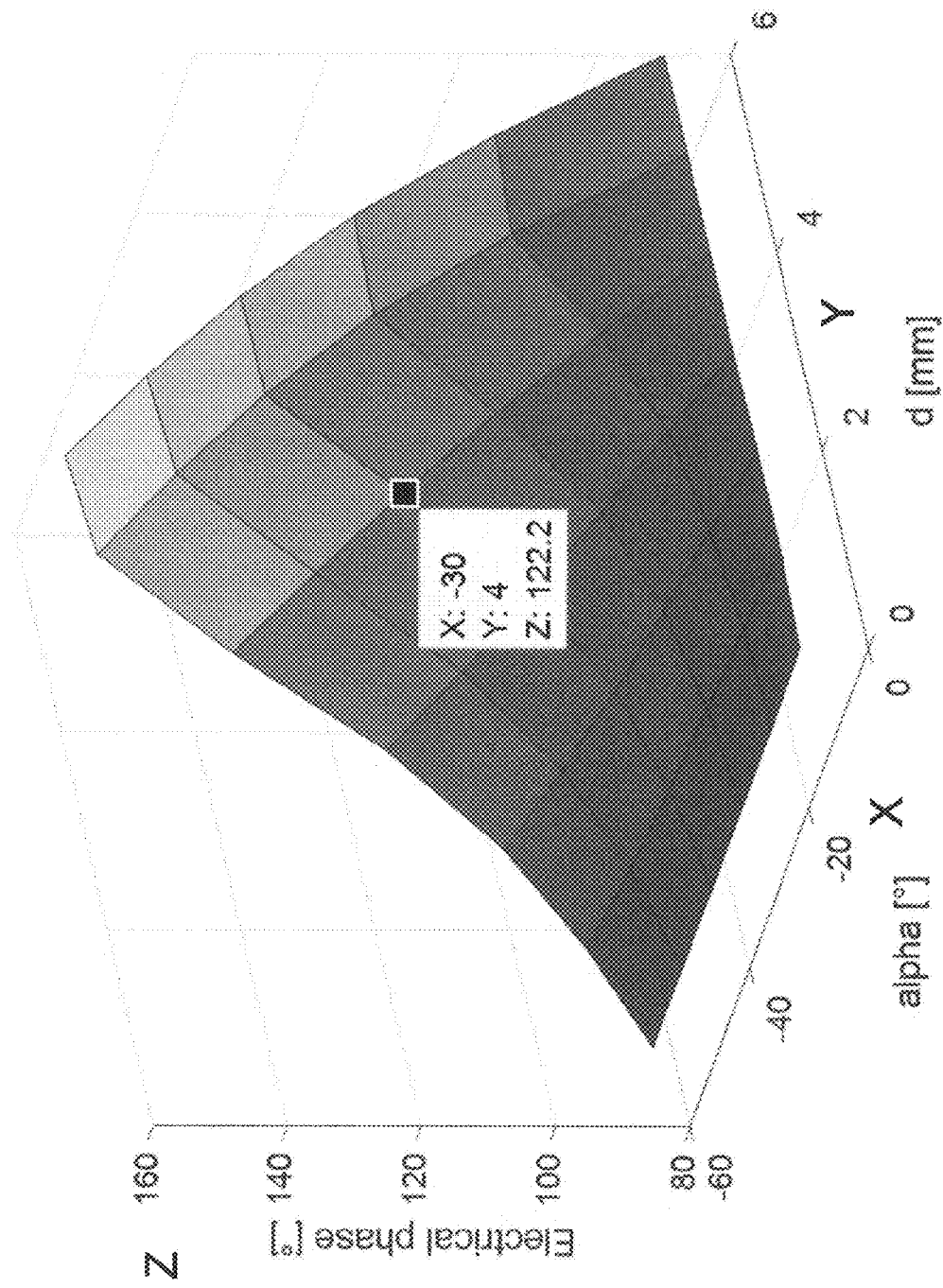
FIG. 3 is a graphical representation of electrical phase for offset angle and displacement with respect to a ring magnet.

FIG. 3 shows the electrical phase of the first and second outputs of the magnetic field sensor varying by twist angle α and displacement d in relation to a ring magnet. With zero twist angle, it can be sees that phase is virtually fixed at 90°. The same holds if the sensing element position is aligned with the ring magnet centerline (d=0) and the device is twisted. In order to see the effect of the twist angle α on the phase relationship, there must be a displacement d of the sensor from the ring magnetic centerline.

As can be seen, electrical phase relationship of the sensor outputs corresponds to the twist angle α and displacement d. The point highlighted (X: –30, Y:4, Z:122.2) shows that with –30° of twist angle, and displacement d of 4 mm, ~120° of phase separation is achieved. Twisting the sensor in the opposite direction (+30°) results in a phase shift of ~60°. As will be appreciated, there are a number of α and d solutions for a desired phase relationship. That is, for a given target phase shift, there is a set of solutions that exist along the line resulting from the intersection of a plane located at the specified phase, and the resulting illustrated mesh function of α and d.

Figure 3A:
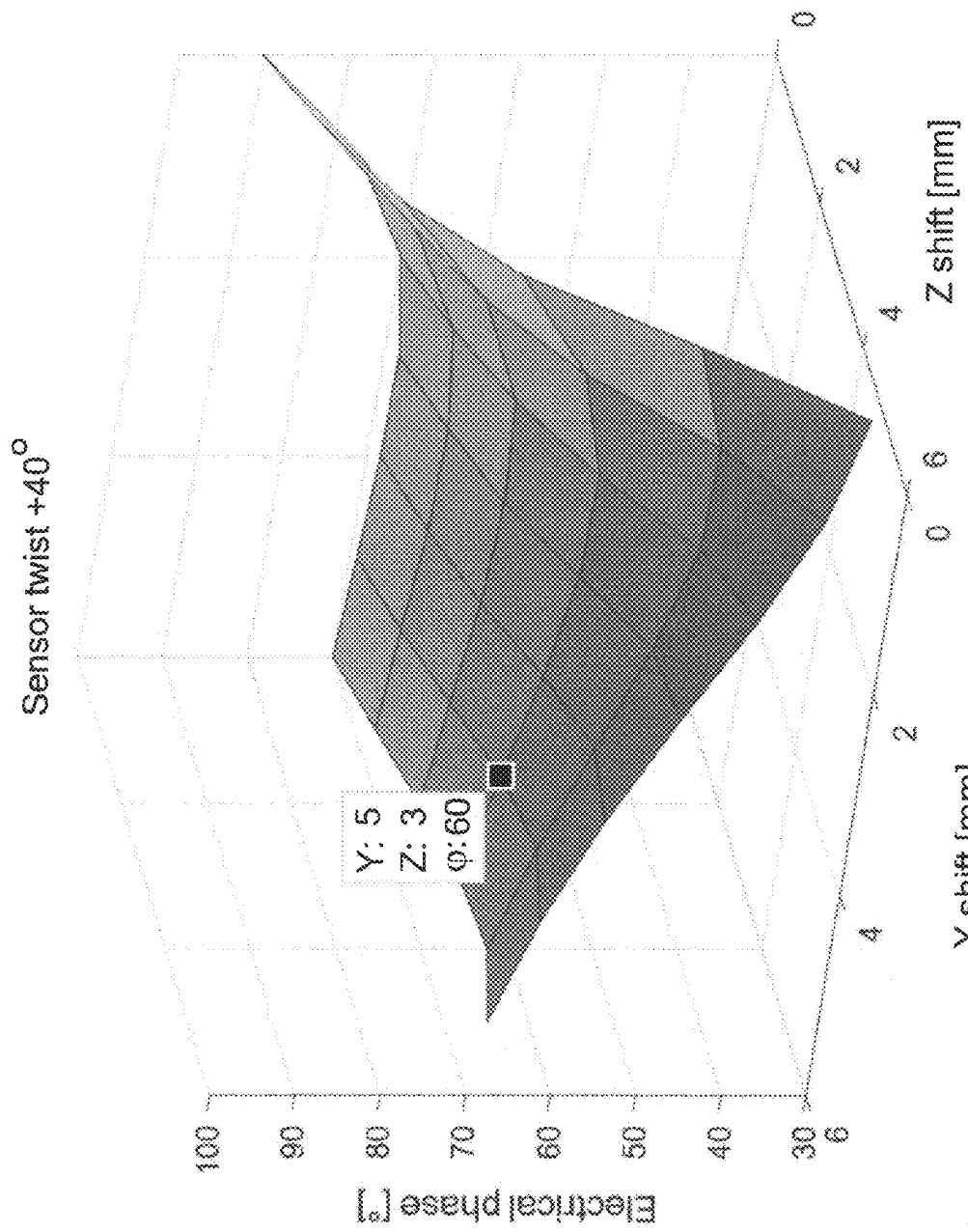
FIG. 3A shows a further graphical representation of electrical phase for offset angle and displacement with respect to a ring magnet.

FIG. 3A shows a further mesh function representation of electrical phase φ of the first and second outputs of the magnetic field sensor with sensor positioning in the y and z dimensions in relation to a ring magnet for optimizing a position of the sensor along y axis (consistent with the y-axis of FIG. 1). This allows a user to determining sensor positioning that is less sensitive to mechanical tolerances.

For example, a desired electrical phase φ is 60 degrees. For the selected point [Y:5, Z:3, φ:60] the displacement d corresponds to Z shift axis. The sensor twist angle α is fixed at 40°. There is also a 5 mm shift in sensor position on the Y axis.

Figure 3B:
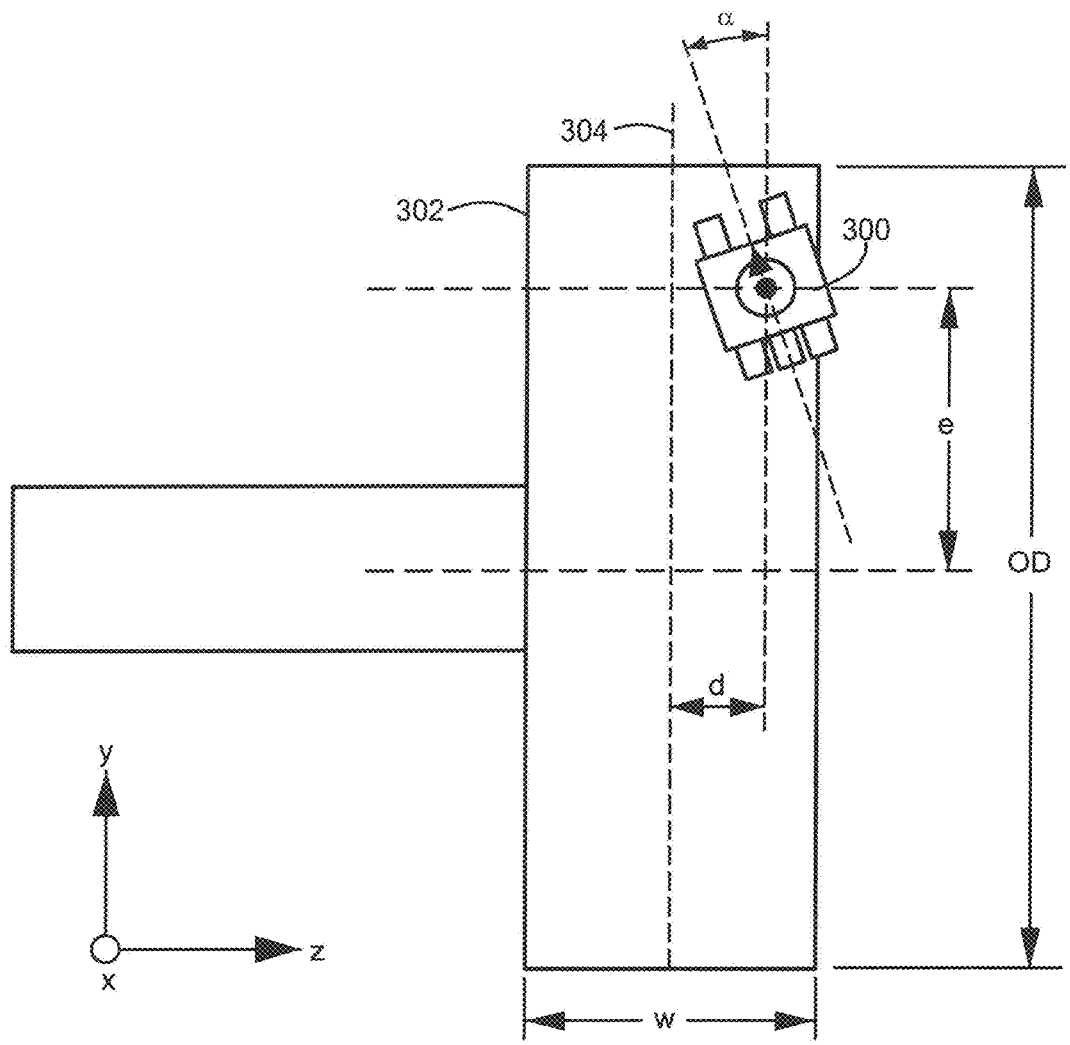
FIG. 3B shows a further schematic representation of a multi-channel magnetic field sensor positioned in relation to a ring magnet.

FIG. 3B shows a sensor 300 positioned in relation to a ring magnet 302 with a twist angle α of about 20 degrees, a displacement d from the ring magnet centerline 304, and a y-axis displacement e, which is defined in relation to a location of the a sensing element and a rotation axis of the ring magnet 302.

While illustrative embodiments are shown and described in conjunction with dual channel magnetic field sensors, it is understood that any practical number of channels and magnetic field sensing elements can be used to meet the needs of a particular application.

Figure 4:
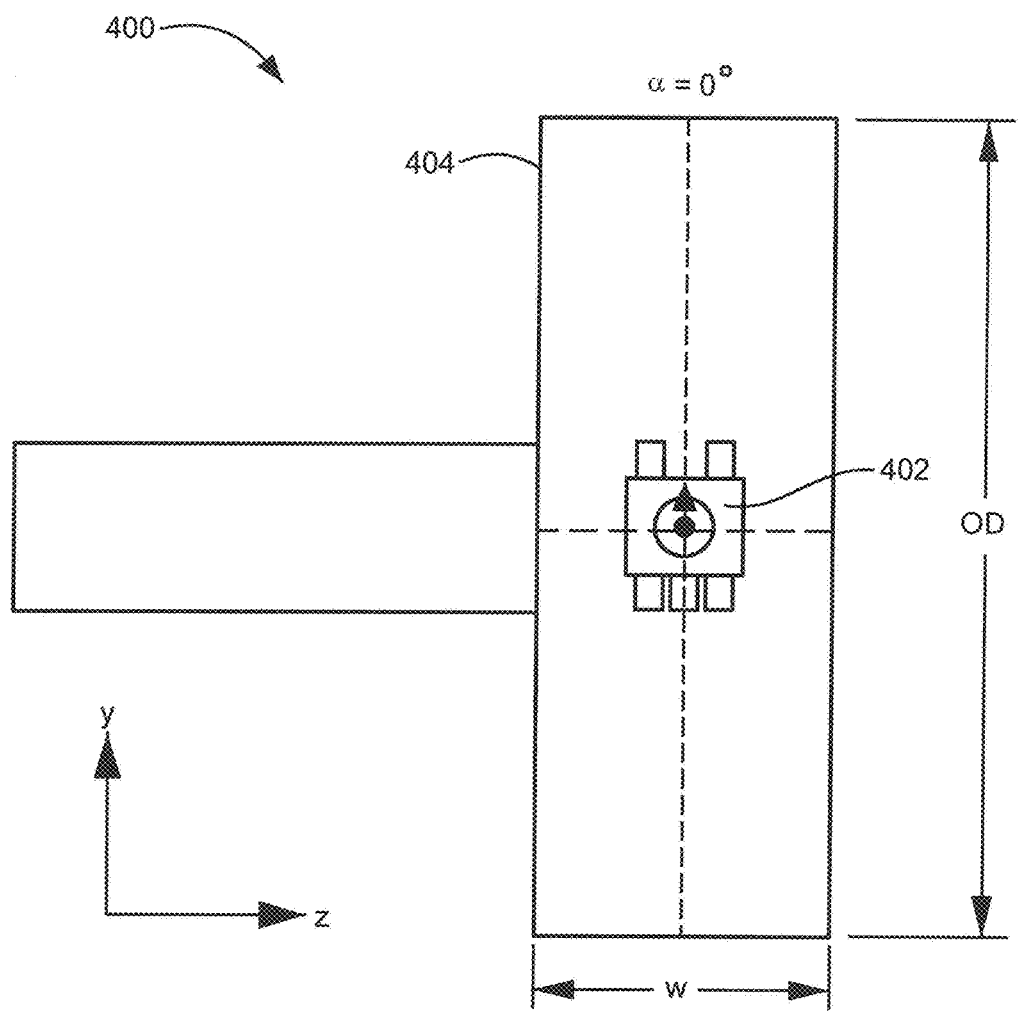
FIG. 4 is a schematic representation of a magnetic field sensor and ring magnet in a conventional arrangement.
Figure 4A:
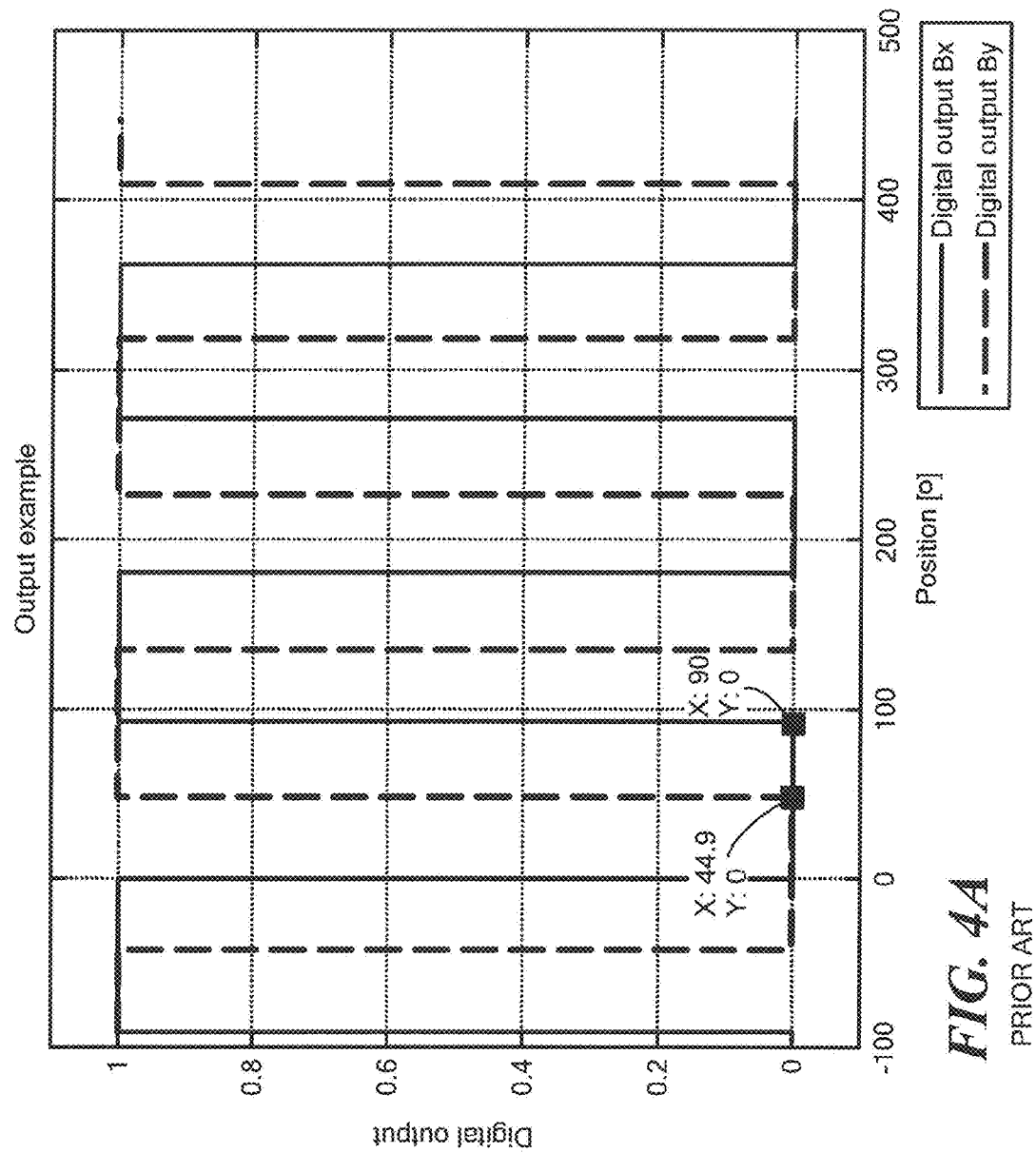
FIG. 4A is a graphical representation of the sensor outputs for the arrangement of FIG. 4.

FIG. 4 shows a conventional arrangement 400 of a dual channel magnetic field sensor 402 and ring magnet 404 with no twist, i.e., α=0, and no displacement, i.e., d=0 and e=0. The sensor 402 has first and second outputs with the sensor sensing along x and y axis with distance d=0 and α=0°. FIG. 4A shows the sensor outputs for the arrangement for FIG. 4 in a conventional ninety degree phase offset between the first and second output channels. The ring magnet has 2 pole pairs and w=10 mm. As can be seen in FIG. 4A, the mechanical phase shift between the first and second outputs is 45°. This is equivalent to a 90° electrical phase shift, e.g., electrical phase shift=npp*mechanical phase shift. This is the conventional behavior of a 2D sensor having a 90° shifted sensing axis.

In an illustrative embodiment, the magnetic field sensor comprises a Hall-effect latch for sensing planar and vertical magnetic field directions. The dual operation of the planar and vertical Hall elements allows the end user to achieve phase separation that is independent of magnetic pole spacing on the ring magnet. The sensor channel outputs allow rotation direction to be determined, such as when sensing a rotating ring-magnet target.

In illustrative embodiments, a dual channel two dimensional Hall Effect latch-type magnetic field sensor is positioned in relation to a ring magnet to effect the desired phase relationship of the sensor output signals. In embodiments, sensor outputs switch low (turn on) when a south polarity magnetic field perpendicular to the Hall-effect sensor exceeds the operate point threshold (BOP). In other embodiments, a sensor provides a continuous analog output with phase separation.

As shown in FIGS. 5A-D, the sensor package can be configured to detect a variety of magnetic field orientations. FIGS. 5A and 5B shows a sensor package having a planar Hall element and a vertical Hall element for sensing magnetic fields when the package faces the ring magnet (FIG. 5A) or when a leaded side of the package faces the ring magnet (FIG. 5B). FIGS. 5C and 5D show magnetic field detection for a sensor package facing the ring magnet (FIG. 5C) or a non-leaded side of the package facing the ring magnet (FIG. 5D). It is understood that the sensor can have various twist angles and displacement, as described above, to achieve a desired phase relationship for the sensor output signals.

Figure 6:
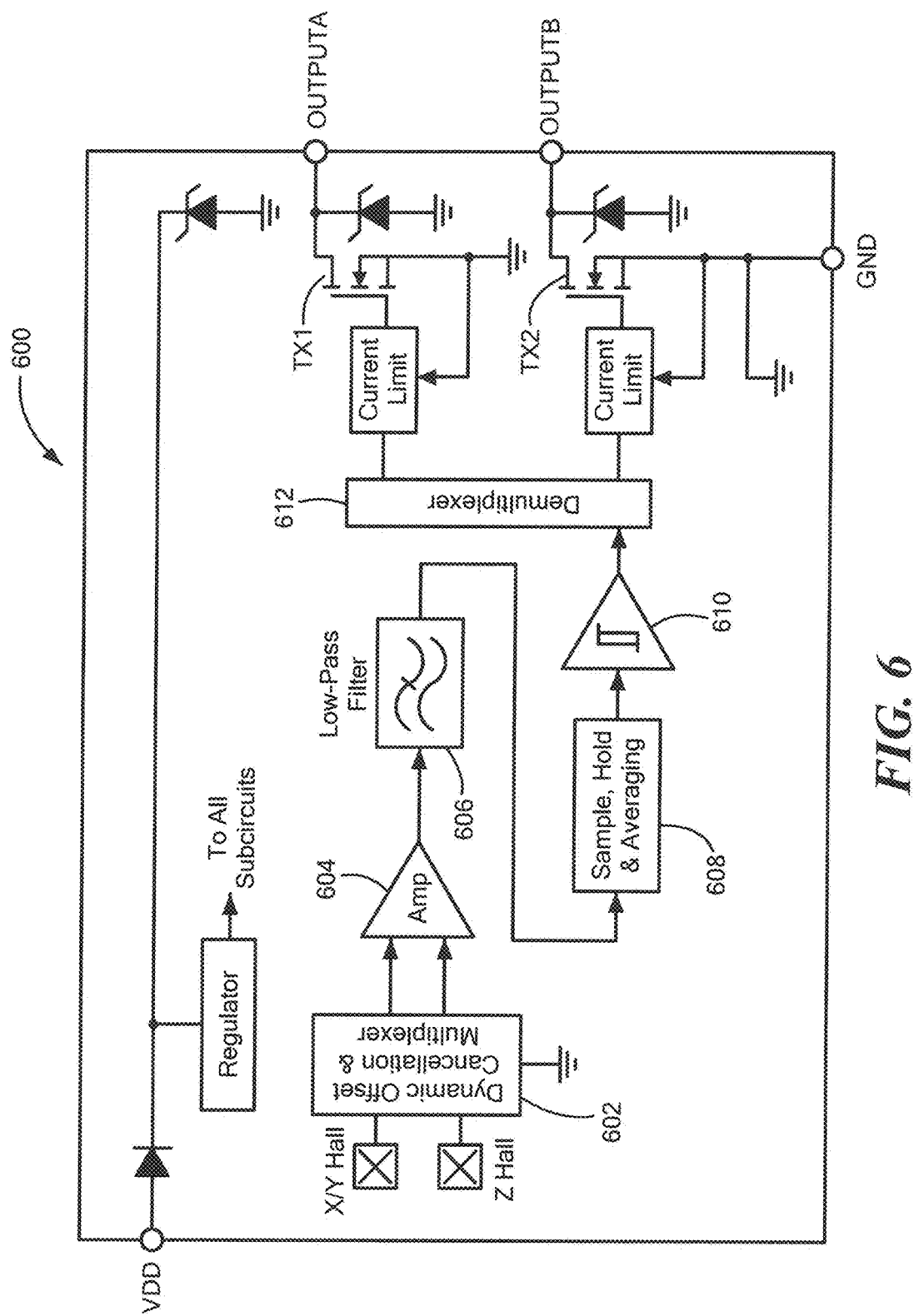
FIG. 6 is a functional block diagram of an illustrative magnetic field sensor having planar and vertical sensing elements.

FIG. 6 shows an illustrative functional black diagram of a dual channel magnetic field sensor 600 that can be positioned in relation to a ring magnet to achieve a desired phase relationship of the sensor outputs. In embodiments, a magnetic field sensor comprises a single silicon die with a planar Hall plate (Z) and a vertical Hall plate (X/Y). The Hall plates are coupled to a module 602 providing dynamic offset cancellation and multiplexing. The module 602 output is coupled to a small-signal amplifier 604, a low pass filter 606, a sample, hold, and averaging module 608, a Schmitt trigger 610, a demultiplexer 612 and respective short-circuit protected NMOS output transistors TX1, TX2 to provide output A and output B. It is understood that the axes used herein are not intended to refer to any global position, but rather to define positions of one thing in relation to another.

Figure 7:
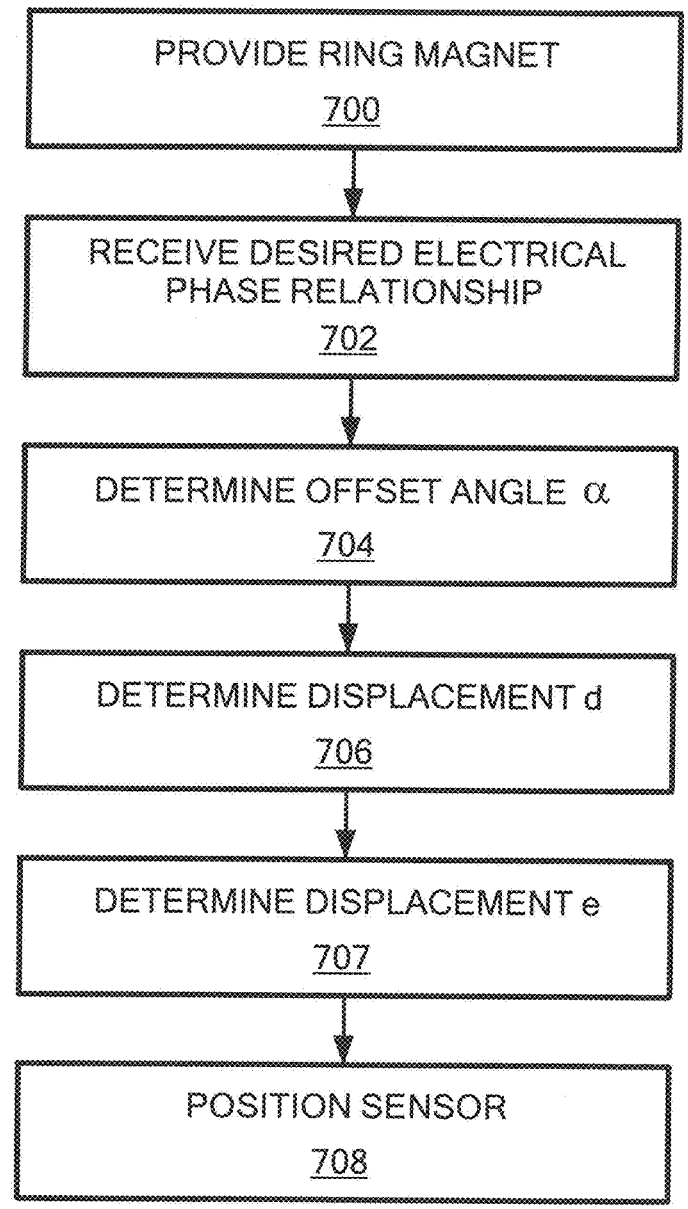
FIG. 7 is a flow diagram showing an illustrative sequence of steps for achieving a desired electrical phase relationship between first and second outputs of a multi-channel magnetic field sensor.

FIG. 7 shows an illustrative sequence of steps for achieving a desired electrical phase relationship between outputs of a multi-channel magnetic field sensor. In embodiments, the magnetic field sensor is provided in an IC package containing a planar magnetic field sensor and a vertical magnetic field sensor. In step 700, a ring magnet having a given number of pole pairs is provided. In illustrative embodiments, the ring magnet has a width defining a centerline and an axis of rotation. In step 702, a desired electrical phase relationship between outputs of the multi-channel sensor is received. In step 704, an offset angle α defined by the sensor and magnetic field sensing elements is determined and in step 706 a displacement d of the magnetic field sensing elements from the ring magnet centerline is determined. In optional step 707, a displacement e can be determined. It is understood that the offset angle α and displacement d together define the phase relationship. That is, there is no sequence for offset angle α and displacement d. In one embodiment, the offset angle α and displacement d are selected from a mesh function relating electrical phase to the offset angle α and displacement d. For example, a desired phase of 120 degrees can be achieved by selecting a solution of α and d from the mesh function and positioning the sensor in relation to the ring magnet accordingly in step 708. It is understood that a user can perform an analysis to evaluate tradeoffs for achieving a target phase margin performance. For example, points located on steeper parts of the curve, may be more sensitive to assembly tolerance, vibration, magnetic target wobble, and the like, such as parameter e.

While illustrative embodiments of the invention are shown and described in conjunction with dual channel latch-type, Hall Effect magnetic field sensors, it is understood that any suitable type sensor having a suitable type of magnetic field sensor, such as those listed above, can be used.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
   for a magnetic field sensor IC package having a first channel for a planar magnetic field sensing element and a second channel for a vertical magnetic field sensing element, receiving a desired phase relationship between the first and second channels;
   positioning the IC package in relation to an axis of a ring magnet to provide the desired phase relationship between the first and second channels; and
   positioning the IC package to a non-zero twist angle with respect to the axis and a non-zero displacement with respect to the axis,
   wherein the phase relationship is selected using a mesh function of the offset angle and displacement for the sensor.

2. The method according to claim 1, wherein the axis corresponds to a centerline of the ring magnet.

3. The method according to claim 2, wherein the centerline corresponds to one-half a width of the ring magnet.

4. The method according to claim 1, wherein the desired phase relationship is about 120 degrees.

5. The method according to claim 1, wherein the desired phase relationship is about 60 degrees.

6. The method according to claim 1, further including displacing the IC package position a distance from an axis of rotation of the ring magnet.

7. The method according to claim 1, wherein the IC package has a longitudinal axis defined by being parallel to a sensing direction of the first sensing element, wherein the twist angle is defined by the longitudinal axis of the IC package and a centerline of the ring magnet.

8. The method according to claim 1, wherein a substantially planar face of the IC package defines an air gap with a surface of the ring magnet.

9. The method according to claim 1, wherein the planar magnetic field sensing element and the vertical magnetic field sensing element are formed as part of a single die.

10. The method according to claim 1, wherein the planar magnetic field sensing element and the vertical magnetic field sensing element are substantially collocated.

11. The method according to claim 1, further including positioning the IC package to lessen sensitivity to mechanical tolerances.

12. The method according to claim 1, wherein the first sensing element comprises a Hall element.

* * * * *

UNITED STATES PATENT AND TRADEMARK OFFICE
CERTIFICATE OF CORRECTION

PATENT NO. : 9,976,876 B2  
APPLICATION NO. : 14/950104  
DATED : May 22, 2018  
INVENTOR(S) : Ryan J. Metivier et al.

Page 1 of 1

It is certified that error appears in the above-identified patent and that said Letters Patent is hereby corrected as shown below:

In the Specification

Column 3, Line 25 delete "(GMR) element, for example" and replace with --(GMR) element,--.

Column 5, Line 27 delete "it can be sees" and replace with --it can be seen--.

Column 5, Line 38 delete "phase shift of ~60°)" and replace with --phase shift of ~60°--.

Signed and Sealed this  
Twentieth Day of November, 2018

Andrei Iancu  
*Director of the United States Patent and Trademark Office*